Sept. 17, 1935.  A. P. SCHECHTER ET AL  2,014,988
FLEXIBLE TUBE AND COUPLING
Filed Feb. 9, 1935

WITNESSES

INVENTORS
Alfred P. Schechter
and Alexander Hedeman
BY
ATTORNEYS

Patented Sept. 17, 1935

2,014,988

UNITED STATES PATENT OFFICE 2,014,988

FLEXIBLE TUBE AND COUPLING

Alfred P. Schechter, New York, and Alexander Hedeman, Long Beach, N. Y.

Application February 9, 1935, Serial No. 5,796

1 Claim. (Cl. 137—90)

This invention relates to flexible tubes and couplings for use in various places, particularly in the dispensing of beer and similar liquids, an object being to provide a construction which may be quickly applied and removed without injury to any of the parts.

Another object of the invention is to provide a flexible tube for carrying beer, milk, and other liquids, which may be quickly connected to the source of supply and to a dispensing valve or a suitable receiving container and quickly disconnected therefrom, the tube being flexible throughout, and, consequently, capable of ready bending or bowing to permit the respective ends to be connected easily.

A further object, more specifically, is to provide a device for carrying liquids wherein a smooth bore flexible metal tube is used and is reinforced by a winding of wire forming a spring coating, the parts being so removed that the tube may slide within the spring surrounding the same.

In the accompanying drawing—

Figure 1:
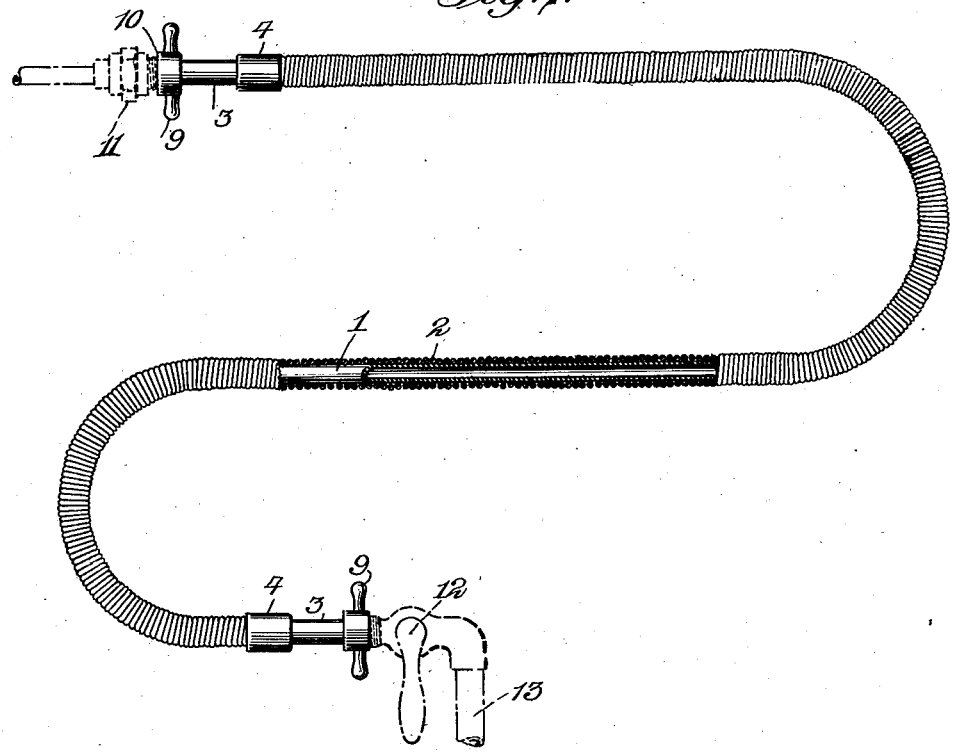
Figure 2:
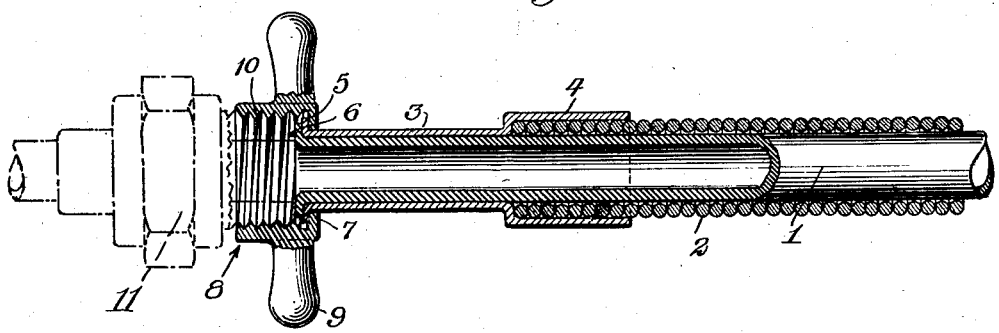

Figure 1 is a side view of a flexible tube and coupling disclosing an embodiment of the invention, certain parts being broken away for better illustrating certain detail structures; and Fig. 2 is an enlarged view principally in section showing how the coupling functions.

In dispensing various beverages, as, for instance, beer, barrels or kegs of beer must be connected from time to time to a dispensing unit or to a line leading to the unit, and, consequently, the connecting pipes must be applied and removed. Some form of flexible connection must be used, or pipes must be cut to take care of different distances between the outlets of the barrels and the unit. Where the device is used to carry milk, it may be connected up so as to carry milk from a tank to a wagon or other container. It will be understood that the invention is in the flexible tube and coupling which may be used for various purposes, though particularly adapted to carry beer, milk, or other food liquids.

In the present invention, a flexible metal tube is provided with suitable connections so that the distance between the supply and the outlets may vary quite appreciably without affecting the usefulness of a certain length of tube.

As illustrated in the drawing, the tube consists of a smooth bore metal tube 1 surrounded by a winding 2, preferably of spring wire, said winding extending the full length of the pipe 1, except the end portions, as shown particularly in Fig. 2. The respective end portions of the tube 1 are covered by a comparatively stiff metal sleeve 3, having an enlargement 4 for the reception of the end portion of winding 2. The stiff metal sleeve is bent over at the end to form a flange 5, and the end of the tube 1 is also bent over to form a flange 6. These bent-over portions overlap the flange 7 of a coupling 8. Each coupling is provided with a tubular portion 10, which is adapted to screw on to the threaded part of a fitting 11. This is true of both ends, the fitting 11 at one end being formed as a valve 12. The liquid may be discharged directly out the valve 12 or through a pipe 13, to a suitable discharge point.

It will be understood that the respective ends of the device are constructed identical, as shown in Fig. 2, so that either end may be connected with the fitting 11, or to the valve 12. The winding 2 is somewhat loose on the tube 1, though most of the turns contact therewith, so that the pipe 1 may be bent into different contours, as, for instance, as shown in Fig. 1, and, at the same time, not break or crack. By reason of this construction, a continuous metal pipe is provided from one end of the device to the other.

The material of which the tube 1 is made may vary but should be of some material which will readily bend, as, for instance, tin or a mixture of tin ore with other metals. The wire or winding 2 is preferably steel, cadmium, or it may be formed from other resilient metal, as, for instance, brass. By reason of the ready bendable nature of the tube, it may be formed into different contours and the ends, therefore, readily caused to fit spaced points, as, for instance, the valve 12 and fitting 11. The tube 1 being continuous and the reinforcing winding acting continuously thereon, prevents any kinking or swelling of the tube and also the one-piece nature of the tube 1 prevents leakage.

In addition, the tube 1, being a continuous metal tube and having a smooth bore is readily cleaned so that the tube may be continuously maintained in a permanent sanitary condition as it may be readily cleaned after each use.

We claim:

A device of the character described, including a flexible tube formed from a metallic bendable pipe smooth interior and exterior for its entire length, a flexible metal member formed as a winding loosely positioned over said pipe and extending from near one end to near the opposite end, the coils of said winding lightly touching each other and lightly touching said pipe so that the pipe and winding may move longitudinally independently of each other, a comparatively stiff metal sleeve surrounding said pipe at each end thereof, each of said sleeves having an anchoring radiating flange at one end and a tubular portion at the upper end telescoping over a number of coils of said winding, the turns of said winding being loosely in contact at all times and acting to prevent kinking of said bendable pipe when said flexible tube is deformed from a straight line.

ALFRED P. SCHECHTER.
ALEXANDER HEDEMAN.